July 27, 1926.
S. J. BOUGHTON
1,593,564
ENGINE BALANCER
Filed Oct. 23, 1925
2 Sheets-Sheet 1
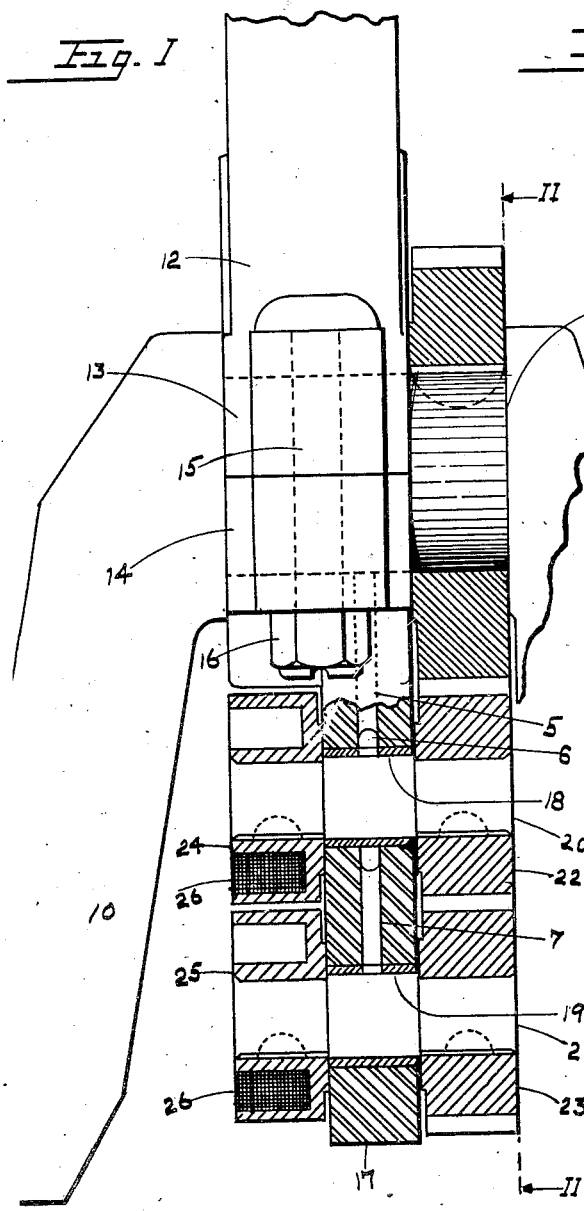
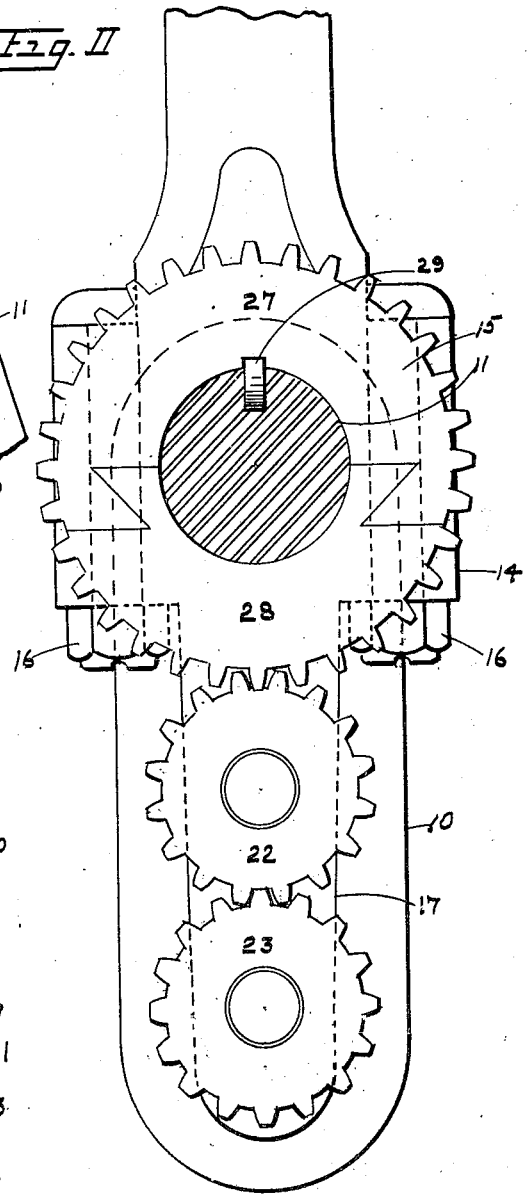
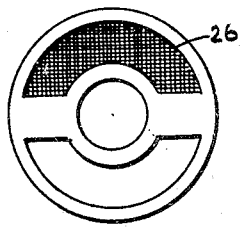
INVENTOR.
Solon J. Boughton

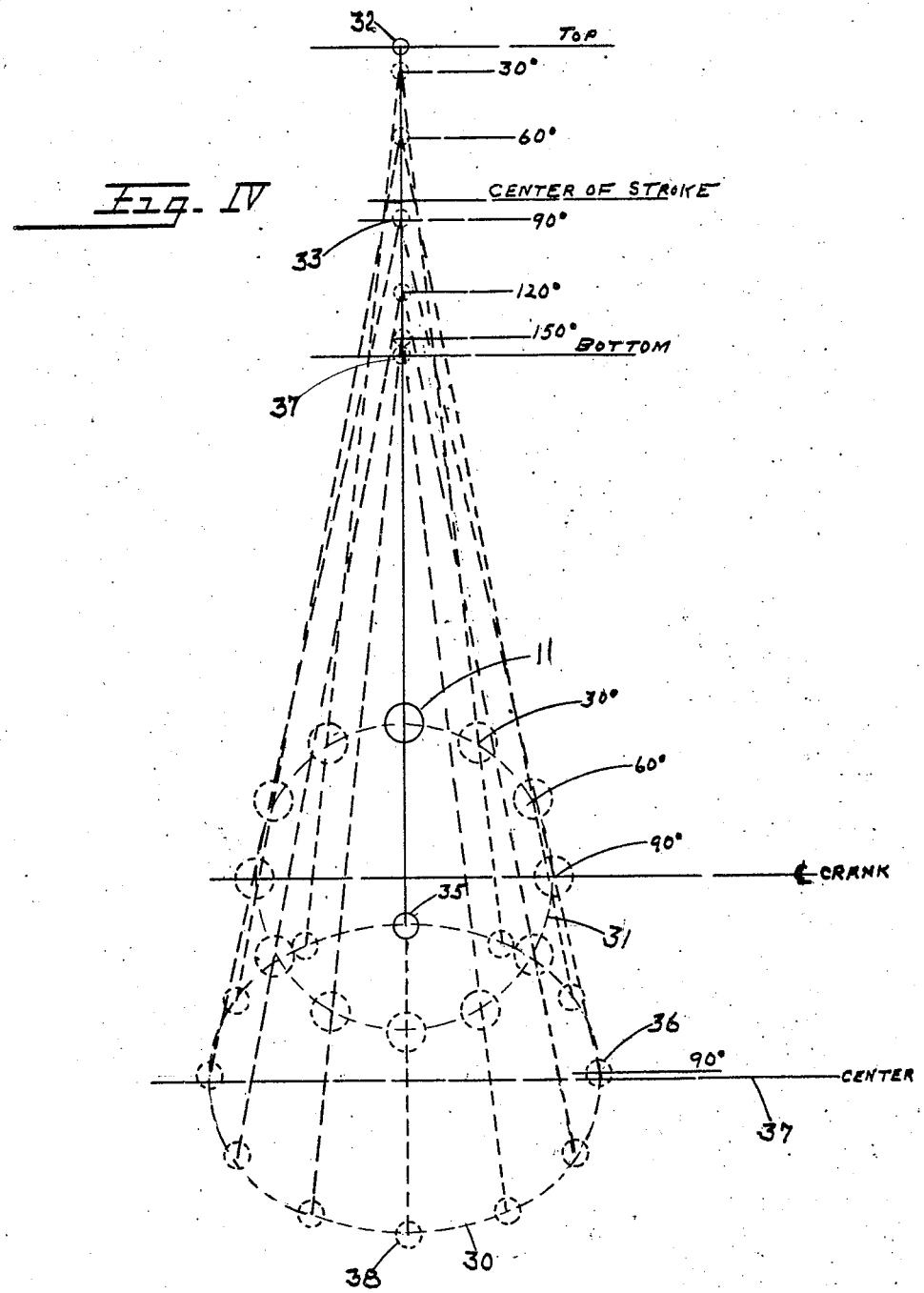

Patented July 27, 1926.

1,593,564

UNITED STATES PATENT OFFICE.

SOLON J. BOUGHTON, OF TOLEDO, OHIO, ASSIGNOR TO THE WILLYS-OVERLAND COMPANY, OF TOLEDO, OHIO, A CORPORATION OF OHIO.

ENGINE BALANCER.

Application filed October 23, 1925. Serial No. 64,480.

This invention relates to improvements in engine balancers of the type employed for counterbalancing vibrations set up by secondary inertia forces such as occur in motors which have the cylinders in line and the crank pins in a single plane.

One of the objects of the invention is to provide an apparatus which takes advantage of the principle of so called "bob weights", that is weights attached to the lower ends of the connecting rods for the purpose of bringing the centers of gravity of the connecting rods down to the axes of the crank pin bearings while employing weights of less mass than are necessary in previously suggested constructions.

Another object is the provision of means, moving with the connecting rod, for producing vertical vibrations at double crank shaft speed.

A further object is the provision, in mechanism of the class described, of means for mounting upon a crank pin a gear, the internal diameter of which is too small to permit its being slid onto the shaft from one end of the latter.

Other objects, and objects relating to details of construction and economies of manufacture, will appear as I proceed with the description of that embodiment of the invention which, for the purposes of the present application, I have illustrated in the accompanying drawings, in which:—

Figure I is a side elevational view of a fragment of a crank shaft and connecting rod with my balancing device shown principally in central, vertical, longitudinal section.

Fig. II is a view showing the connecting rod and balancing mechanism in elevation and the crank shaft in cross section taken substantially on the line II—II Fig. I.

Fig. III is an end view of a rotating weight, and

Fig. IV is a diagram illustrating the relative positions of an engine piston with its related reciprocating parts and of the corresponding crank pin and center of mass of a balancing bob weight.

Similar reference characters refer to like parts throughout the views.

In the drawing 10 represents a fragment of the crank shaft of an internal combustion engine, such for instance as a four cylinder in line engine with the crank pins in a single plane. One of the crank pins is seen at 11 in its top center position. The lower or big end of the corresponding connecting rod is shown at 12. The bearing of the connecting rod is split conventionally providing an upper half 13 and a lower half or bearing cap 14. When the two halves are assembled upon the crank pin 11 they are held together by bolts indicated at 15 having nuts 16 threaded thereon.

The bearing cap 14 is provided, preferably integrally, with a depending portion or bar 17 which forms the support for the rotating elements of my invention. To this end, the bar 17 is provided at two points with bores parallel with the axis of the crank pin 11 and intersecting the connecting rod's axis of symmetry. These bores are lined with bushings 18 and 19 which form bearings for short shafts 20 and 21, identical in shape and size. Lubrication may be provided for these bearings by forming in bar 17 an oil duct 5 leading from the crank pin bearing to an annular groove 6 surrounding bushing 18 and another duct 7 leading from groove 6 to the lower bushing 19. On the right hand ends of the shafts 20 and 21, as viewed in Fig. I, are keyed pinions 22 and 23 of equal diameter, while on the left hand ends of the shafts are keyed hollow annular elements 24 and 25 each having two pockets therein. One pocket in each element is filled with a heavy material, preferably lead, as indicated at 26. The elements 24 and 25 when loaded as described have substantially the same mass as the pinions 22 and 23, thus reducing as far as possible the strains upon the bearings in the bar 17. In assembling the parts care must be taken to have the rotating weights, that is the loaded portions 26, both down or both up at the same time.

The means for driving intermeshing pinions 22 and 23 consists in a gear formed of two sections 27 and 28 having semi-circular bearing surfaces and finished with an interlocking dovetail joint so that the two sections may be positioned on the pin 11 in offset relation and then slid together to form a single gear which is locked to the pin 11 by a key 29. When the parts are all assembled no axial motion between the sections 27 and 28 is possible since the gear is flanked on one side by the connecting rod and its bearing cap and on the other by an annular shoulder formed in the crank shaft.

The gear 27, 28 meshes with gear 22 and is twice the diameter of the latter, the angular relation being such as to bring the loaded pockets 26 at their relatively lowest point when the crank pin 11 is in either its highest or lowest position.

The supporting bar 17 and the pinions and rotating weights carried thereby all go to make up what has been termed in the art a "bob weight", that is a weight rigidly supported at the lower or big end of the connecting rod and projecting beyond its bearing connection with the crank pin. The center of mass of a weight of this kind moves in an ellipse 30 (Fig. IV) while the crank pin moves in a circle 31. During a clockwise 90° movement of the crank pin 11 from top center the mass of the piston and related reciprocating parts, which is represented as centered at 32, moves somewhat more than half the distance between its extremes of motion, that is, to the point marked 33 in Fig. IV. At the same time, the bob weight 35 moves downwardly to the position 36 which is above the horizontal axis 37 of the ellipse 30. The movement of the piston during the second quarter of the crank shaft revolution is from 33 to 37, which is less than during the first quarter and the movement of the weight is from 36 to 38 which is more than its motion in the first quarter. Hence, the deviation of the weight motion from a simple harmonic motion is opposite in character from the deviation of the piston motion, and vibrations which are set up because of these deviations tend to counterbalance each other. The principle of a bob weight may be differently stated thus; that when the combined mass of the piston, connecting rod, weight and weight supporting parts is centered at the crank pin there can be no vibration, because the crank pin has simple harmonic motion and the combined mass centered at its axis enjoys the same kind of motion.

The bob weight type of balancer functions in a satisfactory manner, but it is open to the objection that it practically doubles the bearing loads which must be carried by the crank pins. My invention makes possible a large reduction in the total mass of the bob weight or in the distance of the center of mass of the same below the crank pin, or both, by vibrating a portion of the mass up and down so that in effect the points 35 and 38 remain as shown in Fig. IV while the point 36 stands above its location in that figure. This is accomplished by gearing the rotating weights 26 so that they will both stand at their lowest points when the crank pin is at the top of its motion. Thus when the crank pin is turned through 90° the weights will have turned through 180° or to their highest position, while during the second quarter of the crank revolution the weights turn 180° further, or back to their lowest position. By employing the mechanism described, therefore, the centers of mass of the entire bob weight are elevated considerably at the 90° and 270° positions above what they would be, were solid bob weights employed. The deviation in movement of my bob weight from the simple harmonic motion heretofore mentioned is therefore considerably increased and its effect to counterbalance the opposite deviation in the piston and related parts is therefore increased. In a four cylinder engine there may be employed two of the bob weights described on crank pins 180° apart or, if preferred, bob weights of half the size may be mounted on each of the four connecting rods.

Two masses 26 rotating in opposite directions are employed in order to balance each other so far as horizontal vibrations are concerned. Rotating masses intergeared in this manner so as to produce vertical vibrations without horizontal ones are old in the art, and no claim on this idea broadly is made herein.

While I have shown and described, somewhat in detail, one embodiment of the invention, it is to be understood that this showing and description are illustrative only and that I do not regard the invention as limited to the details of construction illustrated and described herein, except in so far as I have included such limitations within the terms of the following claims, in which it is my intention to claim all novelty inherent in my invention, broadly as well as specifically.

I claim as my invention:

1. In an internal combustion engine, a crank shaft, a connecting rod, a weight depending from the large end of said connecting rod, said weight carrying mechanism for producing vertical vibrations recurring twice for each revolution of the crank shaft, and driving means for said mechanism actuated by the revolution of the shaft.

2. In an internal combustion engine, a crank shaft, a connecting rod, a weight depending from the large end of said connecting rod, said weight including a pair of oppositely rotating weights and means actuated by the revolutions of the crank shaft for driving the said weights at twice crank shaft speed.

3. In an internal combustion engine, a crank shaft, a connecting rod, a weight depending from the large end of said connecting rod, said weight being of a mass less than that necessary to bring the center of mass of the connecting rod to the axis of its crank shaft bearing, said weight including a pair of oppositely rotating weights, and means actuated by the revolution of the crank shaft for driving said rotating weights at twice crank shaft speed.

4. In an internal combustion engine, a crank shaft, a connecting rod, a weight depending from the large end thereof, said weight including a pair of rotating weights, a pair of intermeshing pinions having an equal number of teeth, said pinions being rigid with said rotating weights and a gear with double the number of teeth of the pinions rigidly mounted upon the crank shaft meshing with one of said pinions.

5. In an internal combustion engine, a crank shaft, a connecting rod, a weight depending from the large end thereof, said weight including a pair of rotating weights, a pair of intermeshing pinions having an equal number of teeth, said pinions being rigid with said rotating weights and a gear of double the number of teeth of the pinions keyed to the crank shaft, said gear consisting of two substantially semi-circular sections with interlocking joints adapted to permit the individual movement of said sections longitudinally of the shaft.

6. In an internal combustion engine, a crank shaft, a connecting rod mechanism hung from the big end of the connecting rod for producing vertical vibrations and a gear for driving said mechanism said gear consisting of two substantially semi-circular sections with interlocking joints adapted to permit the individual movement of said sections longitudinally of the shaft.

In testimony whereof, I affix my signature.

SOLON J. BOUGHTON.